United States Patent [19]
Bressel et al.

[11] 3,846,472
[45] Nov. 5, 1974

[54] DEHYDROGENATION OF ORGANIC COMPOUNDS

[75] Inventors: Ulrich Bressel, Mannheim; Werner Fuchs, Ludwigshafen; Rolf Platz, Mannheim, all of Germany

[73] Assignee: Badische Anilin- & Soda-Fabrik Aktiengesellschaft, Ludwigshafen/Rhine, Germany

[22] Filed: Aug. 31, 1972

[21] Appl. No.: 285,247

[30] Foreign Application Priority Data
Sept. 3, 1971 Germany............................ 2144148

[52] U.S. Cl....... 260/465.9, 260/486 D, 260/669 R, 260/680 D, 260/683 R
[51] Int. Cl................ C07c 121/02, C07c 121/32, C07c 69/54
[58] Field of Search.......... 260/669 R, 465.9, 486 D

[56] References Cited
UNITED STATES PATENTS

| | | |
|---|---|---|
| 3,207,806 | 9/1965 | Bajars .......................... 260/465.9 X |
| 3,308,190 | 3/1967 | Bajars .......................... 260/465.9 X |
| 3,308,193 | 3/1967 | Bajars .......................... 260/465.9 X |
| 3,392,205 | 7/1968 | Platz et al. ....................... 260/669 R |
| 3,530,169 | 9/1970 | Platz et al. ......................... 260/486 |
| 3,634,531 | 1/1972 | Platz et al. ....................... 260/699 R |
| 3,716,576 | 2/1973 | Blood et al. .................. 260/465.9 X |

*Primary Examiner*—Joseph Paul Brust
*Attorney, Agent, or Firm*—Johnston, Keil, Thompson & Shurtleff

[57] ABSTRACT

Dehydrogenation of isobutyronitrile, ethylbenzene or methyl isobutyrate with iodine and oxygen into methacrylonitrile, styrene or methyl methacrylate at 400° to 800°C is carried out in a reaction chamber in which there are arranged, in the direction of flow of the bulk of the reactants introduced through a nozzle, coaxially from inside to outside first a mixing zone and then a circulation tube.

4 Claims, 1 Drawing Figure

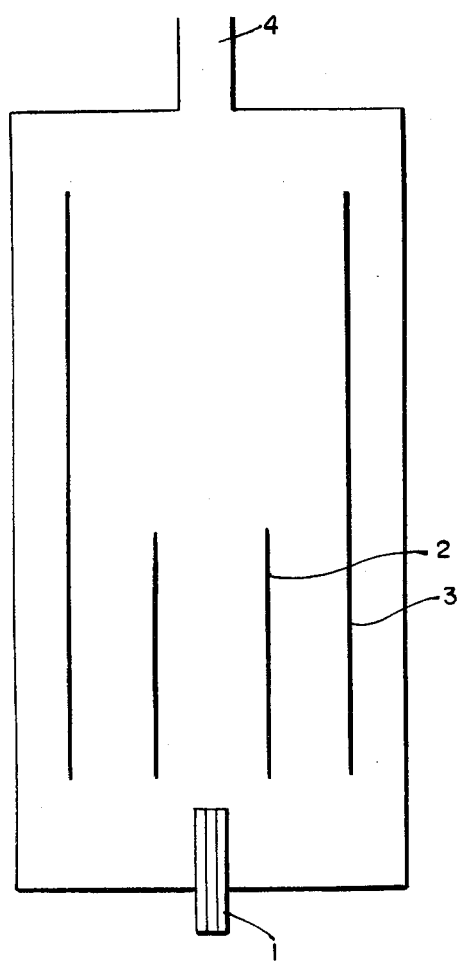

DEHYDROGENATION OF ORGANIC COMPOUNDS

The invention relates to a process for the dehydrogenation of organic compounds on an industrial scale in the presence of halogen or a compound yielding a halogen and oxygen, known in the literature as oxydehydrogenation; the process can be carried out without the addition of a heavy metal as a cocatalyst.

According to the disclosure of U.S. Pat. No. 2,719,171 oxydehydrogenation can be carried out in a particularly favorable manner by allowing the compound to be dehydrogenated and oxygen to act on each other in the presence of iodine or hydrogen iodide. According to German Pat. No. 1,286,022 methyl methacrylate is obtained from methyl isobutyrate in a yield of 83 percent at a 60 percent conversion in a tubular reactor in contact with a magnesium silicate catalyst. Dehydrogenation reactions of this type are known to proceed very exothermally because of the heat of combustion of hydrogen. The translation of exothermic reactions from a laboratory scale to industrial scale however involves serious technical problems, particularly as regards the large amounts of heat evolved and the aggressive nature of iodine. Thus it is very difficult if not impossible to carry out this particular process on an industrial scale.

Another disadvantage which has always accompanied the said oxydehydrogenation is the need to adhere more or less closely to specific residence times of the reactants in the reaction zone. When this residence time is exceeded, there is a risk of the formation of by-products and a decrease in the good yields, which may make it necessary to process the reaction product in a complicated manner. A favorable result therefore is often obtained with a great loss of expensive starting material. It is possible to reduce this loss by elaborate methods, for example by first allowing the iodine to react intermediately with Group VIII (Fe, Co, Ni) metals, thus modifying the activity of the catalyst. This entails (in spite of the technical advance undeniably achieved thereby) complications, particularly in the feeding of such plant. The method has therefore hitherto been viable at the most for semi-commercial operation.

The object of carrying out iodine dehydrogenation of organic compounds on an industrial scale has now been achieved in an unexpected and surprising manner by a completely novel concept. The process proceeds in principle by the same mechanism as specified for the variants described above.

The new process for dehydrogenation of vaporizable organic compounds of three to 20 carbon atoms in the presence of a halogen or a compound yielding a halogen and of molecular oxygen at a temperature of from 400° to 800°C comprises introducing the bulk of the reactants through nozzles at a speed of at least 5 meters/second into one or more (for example two or three) successive mixing zones situated in the reaction chamber and extending in the direction of flow of the reactants, the diameter of the first mixing zone being from twice to 100 times the diameter of the nozzle and the length of the first mixing zone being from 3 to 30 times its diameter, the mixing zone in turn being located at the inlet end of a circulating tube likewise extending in the direction of flow whose diameter amounts of from 0.1 to 0.95 times the internal diameter of the reaction chamber.

The diameter of the nozzle is the internal diameter of the nozzle (or the sum of the diameters of the nozzles) through which the bulk of the reactants flows into the mixing zone.

The process may be realized particularly well when the bulk of the reactants is introduced through the nozzle(s) at a speed of from 5 meters/second to the speed of sound, preferably from 20 to 90 percent of the speed of sound, into the reaction chamber and the mixing chamber. The processs is preferably carried out using only one mixing zone.

The mixing zone is advantageously constituted by a tube (the actual impulse exchange tube) whose length is from 5 to 25 times its diameter; it is also advantageous for the diameter of the circulating tube to be from 0.4 to 0.7 times the diameter of the reaction zone.

This new method constitutes a great technical advance. The combination of an impulse exchange tube or mixing tube and a circulation tube constitutes, according to our definition, an impulse reactor and can be protected against the strongly corrosive halogen in a simple manner by known features, such as enamelling or lining, without the hitherto necessary carrier of the above-mentioned Group VIII metals.

By means of the process it is now possible to dehydrogenate organic compounds, particularly hydrocarbons, which contain three to 20 carbon atoms and are dehydrogenatable, in the presence of halogen or halogen-yielding compounds, preferably iodine or iodine yielding compounds, on an industrial scale in the presence of oxygen. For example, propane, ethylbenzene, cumene, 1-butene, isobutyronitrile, methyl isobutyrate and other hydrocarbons, provided that they boil no higher than 300°C, can be dehydrogenated, isobutyronitrile, ethylbenzene and methyl isobutyrate being preferred. In principle, organic compounds which contain hetero atoms can also be dehydrogenated in the impulse reactor provided that they contain at least one dehydrogenatable C—C single bond.

The process can readily be carried out and generally is performed in the following manner: When compounds having a decomposition temperature above 300°C are to be used they are evaporated and introduced together with iodine and oxygen into the reaction zone (impulse reactor) via an appropriate nozzle, generally a two-fluid nozzle. If the compound to be dehydrogenated decomposes at temperatures below 400°C, it can be expedient to preheat the other reactants or the gases charged to the impulse reactor to temperatures above the reaction temperature in order to achieve in the reactor a mixing temperature which corresponds to the necessary reaction temperature of from 400°C to 800°C. Desirably the process is carried out using superheated iodine vapor which is obtained for example by splitting aqueous ammonium iodide solution and adding the resulting oxygen-containing and iodine-containing steam via the injection nozzles to the other reactants. In this embodiment it is possible to dehydrogenate the more easily decomposable compounds in accordance with the process of the invention.

The process will be illustrated with reference to the accompanying drawing.

The at least partly evaporated and heated reactants according to the above definition are brought into the reaction zone via a two-fluid nozzle 1, the compound to be dehydrogenated leaving the central opening with a speed of about 150 m/sec. The mixing (i.e., the impulse exchange) of the reactants takes place in the mixing tube 2, i.e., the impulse exchange tube, under conditions of temperature exchange with the reaction zone. The reaction gases leaving the mixing zone, in this case a mixing tube 2, are partly, to an extent limited by the high exit speed of the reaction product, e.g. methyl isobutyrate, drawn in again into mixing tube 2 so that a circulation is set up around this tube. This suction effect is large enough to draw back also into the mixing tube 2 via the circulation tube 3, the part of the reaction gas which is flowing to the reactor exit 4. The circulatory movement of the reaction gases and the resulting impulse exchange result in optimum mixing of the reactants. In a reactor of the dimensions given below a 25-fold cycle occurs for example, that is to say a particle introduced via nozzle 1 only leaves the reaction zone via outlet 4 after circulating 25 times. Under these conditions no definite residence time is set up, such as was to be strictly observed with the prior art methods, as mentioned above, but instead a broad residence time spectrum is obtained because of the circulation and the back-mixing produced thereby. This principle has hitherto only been applied to reactions which are carried out in heterogeneous phase, for the most part to liquid-gas reactions. The successful application of this principle to a purely gaseous reaction therefore is a technical innovation.

In the new process the bulk of the reactants, generally the organic compound to be dehydrogenated, particularly methyl isobutyrate, isobutyronitrile or ethylbenzene, is led, preferably at a velocity which amounts to 20 to 90 percent of the speed of sound (the speed of sound in this material), through one or more nozzles into the mixing zone. The other part of the reactants, generally the iodine, the oxygen and optionally steam, is preferably introduced in the immediate vicinity of the nozzle or nozzles, the velocity of this material generally needing to amount only to a few m/sec, e.g. 1 to 50 m/sec. The gaseous materials not introduced at high speed, e.g., iodine and oxygen, can be introduced separately or together. In the embodiment shown in the drawing, in which the introduction of all the reactants takes place through a two-fluid nozzle, the compound to be dehydrogenated (e.g., methyl isobutyrate, isobutyronitrile or ethylbenzene) is preferably introduced through the inner nozzle at high speed (e.g., at 50 to 90 percent of the speed of sound in the material), and a mixture containing oxygen and iodine is introduced through an annular nozzle arranged concentrically therewith. The velocity of the oxygen-iodine mixture preferably amounts to 5 to 30 m/sec. The oxygen-iodine mixture can however also be introduced through another nozzle whose opening is arranged immediately beside the opening of the nozzle for the compound to be dehydrogenated.

The remaining residue of the reactants and the hot reaction mixture are carried along by means of the gas jet which generally contains the compound to be dehydrogenated into the mixing zone, and the reactants and the reaction mixture are thoroughly mixed with one another therein, because in this region strong shearing forces arise between very rapidly moving gases and relatively slowly moving gases.

In one embodiment of the process several, e.g., two or three, reaction zones are arranged one behind the other in the direction of flow of the gas. It is advantageous for the second reaction zone to have a greater diameter than the first and for the third reaction zone to have a greater diameter than the second. In this embodiment of the new process the number of recirculations of the reaction mixture is further increased.

The dehydrogenation of methyl isobutyrate described in U.S. Pat. No. 2,719,171 produces methyl methacrylate in 70 percent yield with 23 percent conversion. On the other hand, use of an impulse reactor according to the instructions laid down in the preceding Example successfully results in methyl methacrylate in a yield of 80 percent with 35 percent conversion. In carrying out such oxydehydrogenations it is expedient to use temperatures of from 400° to 800°C, preferably from 480° to 550°C, whilst maintaining an average residence time of from 1 to 30 seconds, preferably from 2 to 20 seconds. In this way yields of up to 80 percent (conversions up to 50 percent) can be achieved.

The concentration of the reactants is part of the state of the art and has already been extensively investigated, for example in the article by V. K. Skarchenko, Russ. Chem. Reviews, 37, 1 (1968). Moreover the proportions of the reactants can be accurately copied from U.S. Pat. No. 2,719,171 and German Pat. No. 1,286,022 in the case of the production of methyl methacrylate and no further explanation is required here.

The gases leaving the reactor are, likewise in a known manner, quenched and condensed. For this operation sufficient information is to be found in the literature so that no more details need be given here.

It is surprising that high yields of product should be obtained in this manner, particularly as it would have been expected that with the broad scatter of the residence times the abovementioned side reactions would increase.

In the following Example a reactor (reaction zone) with the following dimensions was used:

|  | Length (mm) | Diameter (mm) |
|---|---|---|
| Reactor | 1920 | 333 |
| Impulse exchange tube 2 | 475 | 67 |
| Circulation tube 3 | 1370 | 216 |
| Outlet 4 | — | 32 |
| Nozzle 1 | — | 5 |

EXAMPLE 1

A 200-liter reactor is fed in the course of 24 hours with 546 kg of gaseous methyl isobutyrate which is preheated to 200°C. To this is added 2.4 m$^3$ (S.T.P.) per hour of oxygen, of which 1.4 m$^3$ (S.T.P.) is charged to a preliminary reactor in which 4 liters per hour of 45 percent aqueous ammonium iodide solution is thermally decomposed, the remaining 1 m$^3$ (S.T.P.) per hour O$_2$ being preheated to 600°C and charged into the reactor direct. The reactants are introduced via a two-fluid nozzle, the methyl isobutyrate being fed through the central opening at a speed of 150 m/sec. The gases containing iodine, oxygen and water fed in through the outer, annular gap make practically no contribution to the initial acceleration required for the operation of the impulse reactor, because the pressure difference between the reactor and the preliminary reactor is kept low. The reaction takes place in the reactor, which has been heated to 520°C with flue gas, the reaction time amounting to 18 seconds.

The reaction mixture is quenched with cold water at the reactor exit and condensed. The organic phase which separates out is continuously drawn off, whereas the aqueous phase is recycled via a cooler to the quenching and condensation operation. The addition of ammonia and hydrazine to the cooling water is controlled by pH and redox measurements. After 24 hours 459.4 kg of product mixture has been obtained, i.e., 84.2 percent of the methyl isobutyrate charged. 41.2 percent methyl methacrylate and 58.2 percent methyl isobutyrate are found, by analysis, in the discharge. The remainder is composed of methyl iodide, propyl iodide and other organic iodine compounds. From this it can be calculated that the yield is 69.4 percent with an efficiency of 35.4 percent and a conversion of 51 percent.

tube orifices 2.2 mm in diameter, through which a total of 0.24 $m^3$ oxygen and 0.12 kg iodine vapor are introduced with a speed of 20 m/sec and at a temperature of 520°C. The two gas streams are mixed in a mixing tube 21 mm in diameter and 140 mm long which is situated 25 mm from the nozzle. The mixing tube in its turn is contained in a circulation tube 76 mm in diameter and 400 mm long arranged concentrically in the reactor. This circulation tube begins 165 mm away from the nozzle outlet. This circulation tube ensures that the reacted gas mixture is led back into the mixing tube and that the oxygen and the iodine and quickly mixed with the ethylbenzene in the mixing tube in the shear gradient between the slowly flowing returned gas and the quickly flowing ethylbenzene vapor.

| Definitions | |
|---|---|
| yield: | moles of methyl methacrylate formed related to moles of methyl isobutyrate used up |
| efficiency: | moles of methyl methacrylate formed related to moles of methyl isobutyrate fed in |
| conversion: | moles of methyl isobutyrate used up related to moles of methyl isobutyrate fed in |
| reaction time: (residence time) | total throughput per unit time related to the reactor volume under reaction conditions. |

EXAMPLES 2 To 6

In the further Examples 2 to 6, in which principally the residence time was altered, the results obtained are as shown in the following Table:

TABLE 1

Dehydrogenation of methyl isobutyrate in a 200-liter reactor at 520°C.

The reaction products leaving the reactor are collected over a period of 24 hours and worked up as described in Example 1. A discharge of 43.5 kg is obtained, composed of 93.6 percent styrene, 4.37 percent ethylbenzene, 1.74 percent benzene and 0.3 percent alkyl iodides. This is a yield of 98.2 percent, an efficiency of 93.4 percent and a conversion of 95.6 percent.

| Example | | 2 | 3 | 4 | 5 | 6 |
|---|---|---|---|---|---|---|
| Methyl isobutyrate fed in | kg | 535.0 | 882.0 | 932 | 800.0 | 846.5 |
| $NH_4I$ solution | kg | 89.0 | 197.7 | 250.8 | 174.0 | 207.0 |
| $O_2$ $m^3$ (S.T.P.)/h | | 2.9 | 3.5 | 4.2 | 5.3 | 6.5 |
| Test period | h | 17.0 | 25.0 | 20.5 | 15 | 12 |
| Residence time | sec | 12.9 | 12.0 | 8.9 | 7.4 | 6.0 |
| Discharge | kg | 445.0 | 757.8 | 772.3 | 709.5 | 786.5 |
| Methyl methacrylate content | % | 38.5 | 37.6 | 39.2 | 36.2 | 30.0 |
| Conversion | % | 47.8 | 46.7 | 51.1 | 44.0 | 35.9 |
| Efficiency | % | 33.7 | 33.0 | 33.2 | 32.7 | 28.5 |
| Yield | % | 70.5 | 70.7 | 65.0 | 74.3 | 79.5 |

EXAMPLE 7

1.8 kg per hour of ethylbenzene vapor at 24°C is charged through a nozzle 0.5 mm in diameter with a speed of 120 m/sec into a reactor 108 mm in diameter of 5.3 liter capacity. At a distance of 8 mm from the center of this nozzle are six concentrically arranged

EXAMPLES 8 To 10

The following substances are converted by the method described in Example 7 : isopropylbenzene to α-methylstyrene, ethyltoluene to vinyltoluene, isobutyronitrile to methacrylonitrile.

The experimental conditions and results are set out in the following Table 2:

TABLE 2

| Example | 8 Isopropylbenzene to α-methyl-styrene | 9 Ethyltoluene to vinyl-toluene | 10 Isobutyro-nitrile to methacrylo-nitrile |
|---|---|---|---|
| Amount fed in (kg/h) | 3.3 | 2.9 | 3.45 |
| $O_2$ ($m^3$ (S.T.P.)/h) | 0.48 | 0.4 | 0.45 |
| Amount of iodine (kg/h) | 0.2 | 0.16 | 0.24 |
| Conversion (%) | 83 | 50.8 | 42.8 |
| Efficiency (%) | 80.2 | 49.5 | 36 |
| Yield (%) | 93.5 | 79 | 82.5 |

We claim:

1. In a process for the production of methylmethacrylate, methacrylonitrile, α-methylstyrene, styrene and vinyl-toluene by dehydrogenation of a corresponding saturated compound selected from the group consisting of methyl isobutyrate, isobutyronitrile, isopropylbenzene, ethylbenzene and ethyltoluene with iodine or iodine-yielding compounds and molecular oxygen at temperatures between 400° and 800°C, the improvement which comprises introducing the saturated compound to be dehydrogenated through a two-fluid nozzle at a speed of from 5 m/sec up to the speed of sound in this material into a mixing zone situated in a reaction zone and extending in the direction of flow, the diameter of said mixing zone being from 2 to 100 times the diameter of said nozzle and its length being from 3 to 30 times its diameter, and said mixing zone in its turn being arranged at the lower end of a circulation tube which likewise extends in the direction of flow, the diameter of said circulation tube being from 0.1 to 0.95 times the diameter of said reaction zone.

2. A process as set forth in claim 1 wherein the reactants are introduced into the mixing zone through the nozzle with a speed from 5 m/sec to 20 to 90 percent of the speed of sound.

3. A process as set forth in claim 1, wherein the mixing zone is a mixing tube whose length is from 5 to 25 times its diameter, and the diameter of the circulation tube is from 0.4 to 0.7 times the diameter of the reaction zone.

4. A process as set forth in claim 1, wherein said mixing zone and circulation tube are arranged essentially coaxially in the reaction zone.

* * * * *